(12) United States Patent
Park et al.

(10) Patent No.: US 9,612,478 B2
(45) Date of Patent: Apr. 4, 2017

(54) CURVED DISPLAY DEVICE

(71) Applicant: Samsung Display Co., Ltd., Yongin, Gyeonggi-Do (KR)

(72) Inventors: Minwook Park, Asan-si (KR); Kee-Bum Park, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/530,972

(22) Filed: Nov. 3, 2014

(65) Prior Publication Data
US 2015/0234235 A1 Aug. 20, 2015

(30) Foreign Application Priority Data

Feb. 14, 2014 (KR) ........................ 10-2014-0017337

(51) Int. Cl.
*G09G 3/36* (2006.01)
*G02F 1/1337* (2006.01)
*G02F 1/1343* (2006.01)

(52) U.S. Cl.
CPC .. *G02F 1/133707* (2013.01); *G02F 1/134309* (2013.01); *G02F 2001/134345* (2013.01)

(58) Field of Classification Search
CPC combination set(s) only.
See application file for complete search history.

(56) References Cited

U.S. PATENT DOCUMENTS

| 7,683,990 B2 | 3/2010 | Li et al. |
| 7,834,962 B2 * | 11/2010 | Satake ............. G02F 1/133305 349/110 |
| 7,855,769 B2 | 12/2010 | Dong |
| 8,279,385 B2 | 10/2012 | Kim et al. |
| 8,456,599 B2 | 6/2013 | Jeong et al. |
| 8,638,403 B2 | 1/2014 | Yoshida et al. |
| 2005/0094077 A1* | 5/2005 | Baek ................ G02F 1/134363 349/141 |
| 2011/0205195 A1 | 8/2011 | Komatsu et al. |
| 2012/0223931 A1 | 9/2012 | Tashiro et al. |

(Continued)

FOREIGN PATENT DOCUMENTS

| KR | 10-0648215 B1 | 11/2006 |
| KR | 1020080028565 A | 4/2008 |
| KR | 1020080048722 A | 6/2008 |

*Primary Examiner* — Nimeshkumar Patel
*Assistant Examiner* — Jacob R Stern
(74) *Attorney, Agent, or Firm* — Cantor Colburn LLP

(57) ABSTRACT

A curved display device includes a display substrate curved in a first direction and including a plurality of pixel areas, and each of the plurality of pixel areas including a first sub-pixel area and a second sub-pixel area, an opposite substrate facing the display substrate, the opposite substrate coupled to the display substrate and curved in the first direction together with the display substrate, and a liquid crystal layer interposed between the display substrate and the opposite substrate, where first domains are defined in the first sub-pixel area along a second direction crossing the first direction, second domains are defined in the second sub-pixel area along the second direction, and a width in the second direction of each of the first domains is equal to a width in the second direction of each of the second domains.

19 Claims, 14 Drawing Sheets

(56) References Cited

U.S. PATENT DOCUMENTS

| | | | |
|---|---|---|---|
| 2012/0280895 A1* | 11/2012 | Yeh | G02F 1/1323 345/87 |
| 2013/0010219 A1* | 1/2013 | Yeh | G02F 1/1323 349/33 |
| 2015/0036073 A1 | 2/2015 | Im et al. | |

* cited by examiner

CURVED DISPLAY DEVICE

This application claims priority to Korean Patent Application No. 10-2014-0017337, filed on Feb. 14, 2014, and all the benefits accruing therefrom under 35 U.S.C. §119, the contents of which are hereby incorporated by reference in its entirety.

BACKGROUND

1. Field

The invention relates to a curved display device. More particularly, the invention relates to a curved display device having a curved display area.

2. Description of the Related Art

A flat panel display device is widely applied to various information-processing devices, such as a television set, a monitor, a notebook computer, a mobile phone, etc., to display an image. In recent years, a curved display device has been developed to improve three-dimensional effect, sense of immersion (or immersiveness), and virtual presence of the image provided to a viewer.

SUMMARY

The invention provides a curved display device having substantially improved display quality.

Exemplary embodiments of the invention provide a curved display device including a display substrate, an opposite substrate, and a liquid crystal layer. The display substrate is curved in a first direction and includes a plurality of pixel areas each including a first sub-pixel area and a second sub-pixel area. The opposite substrate is coupled to the display substrate to face the display substrate and is curved in the first direction together with the display substrate. The liquid crystal layer is interposed between the display substrate and the opposite substrate.

First domains are defined in the first sub-pixel area along a second direction crossing the first direction, second domains are defined in the second sub-pixel area along the second direction. A width in the second direction of each of the first domains is equal to a width in the second direction of each of the second domains.

Embodiments of the invention provide a curved display device includes a display substrate, an opposite substrate, and a liquid crystal layer. The display substrate is curved in a first direction, and includes a plurality of pixel areas each including a first sub-pixel area and a second sub-pixel area and a pixel electrode disposed in each of the plurality of pixel areas. The opposite substrate faces the display substrate, includes a common electrode that generates an electric field in cooperation with the pixel electrode, and is coupled to the display substrate and curved in the first direction together with the display substrate. The liquid crystal layer is interposed between the display substrate and the opposite substrate.

First domains are defined in the first sub-pixel area along a second direction crossing the first direction, second domains are defined in the second sub-pixel area along the second direction. Directions, in which liquid crystal molecules of the liquid crystal layer are aligned in response to the electric field, are the same in at least two domains among the first domains, and directions, in which liquid crystal molecules of the liquid crystal layer are aligned in response to the electric field, are the same in at least two domains among the second domains.

According to the above, since the domains defined in each of the plurality of pixel area are arranged in the direction crossing the direction in which the display substrate and the opposite substrate are curved, the display quality of the curved display device may be prevented from being deteriorated even though the mis-alignment occurs between the display substrate and the opposite substrate.

In addition, the horizontal line, which is caused by the viewing angle of the user, may be prevented from being perceived by the user. Thus, the display quality of the curved display device may be prevented from being deteriorated due to the horizontal line.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1A:
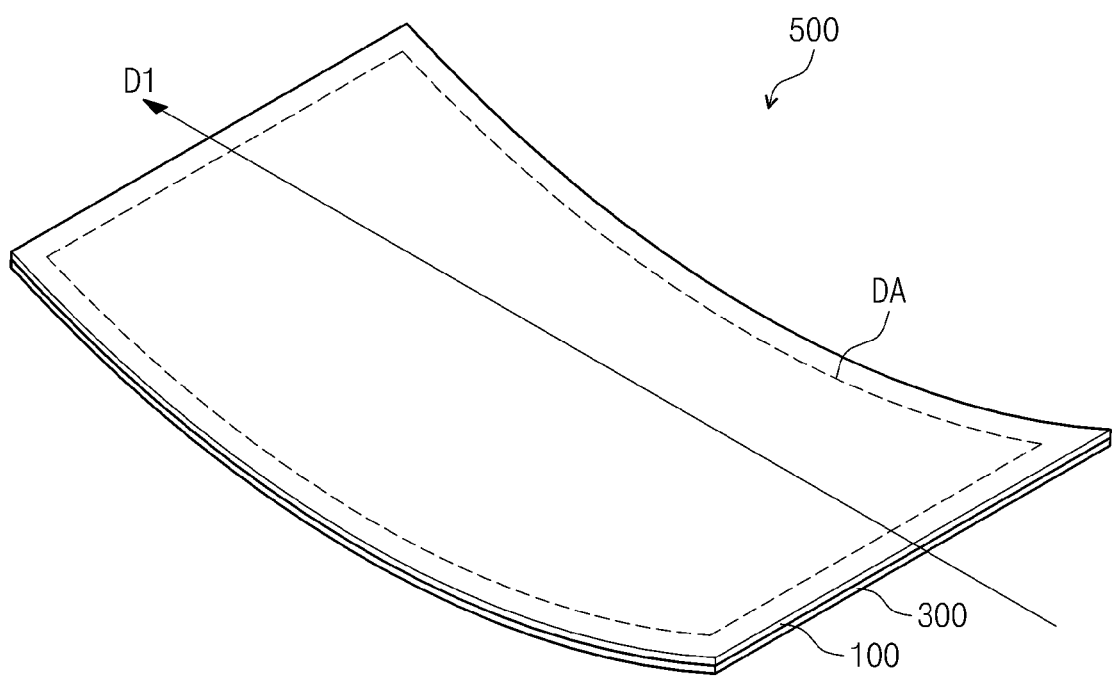
FIG. 1A is a perspective view showing an exemplary embodiment of a curved display device according to the invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1B:
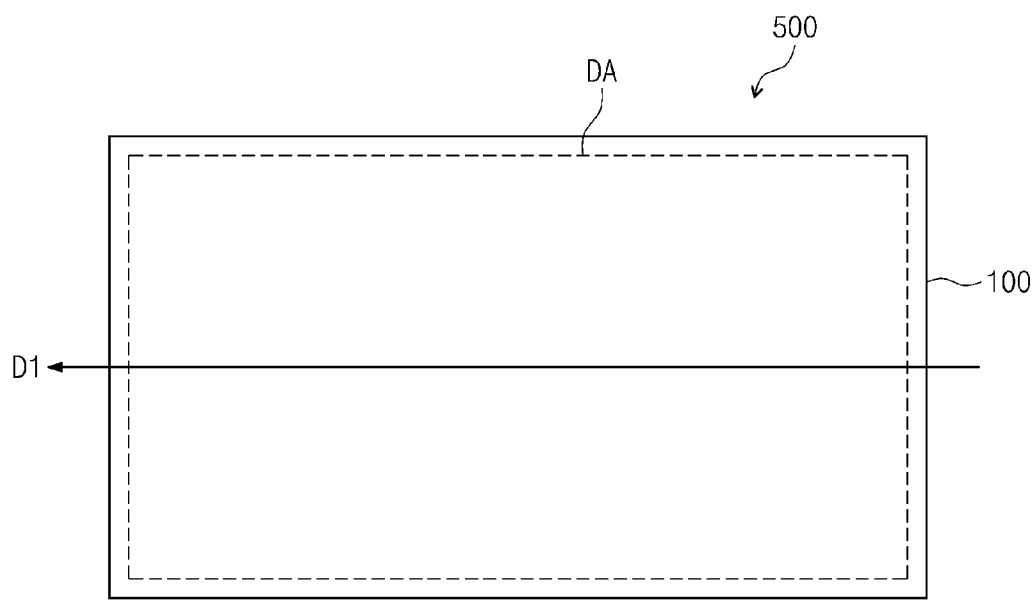
FIG. 1B is a plan view showing the curved display device shown in FIG. 1A.
Figure 1C:
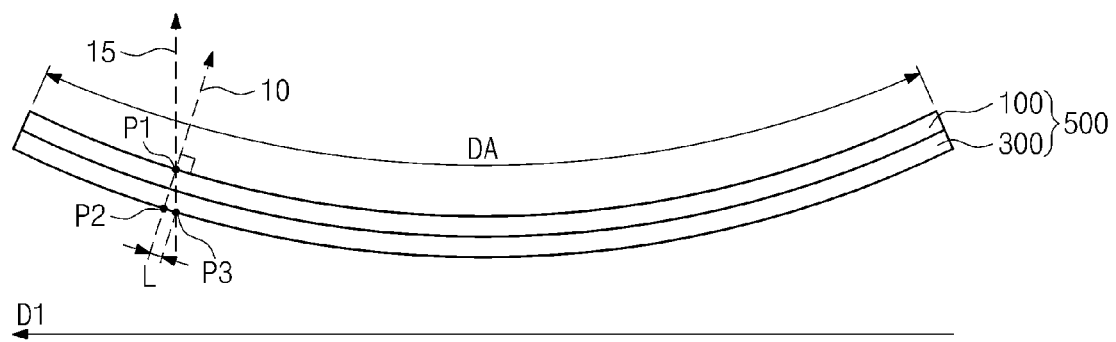
FIG. 1C is a side view showing the curved display device shown in FIG. 1A.

FIG. 1A is a perspective view showing a curved display device 500 according to an exemplary embodiment of the invention, FIG. 1B is a plan view showing the curved display device shown in FIG. 1A, and FIG. 1C is a side view showing the curved display device shown in FIG. 1A.

Referring to FIGS. 1A, 1B, and 1C, the curved display device 500 includes a display area DA in which an image is displayed and has a curved shape. Accordingly, the curved display device 500 may display the image having substantially improved three-dimensional effect, sense of immersion (or immersiveness), and virtual presence using the display area DA.

In an exemplary embodiment, the curved display device 500 may be, but not limited to, a liquid crystal display device, for example. The curved display device 500 includes a display substrate 100, an opposite substrate 300, and a liquid crystal layer LC (refer to FIG. 3A). The opposite substrate 300 faces the display substrate 100 and is coupled to the display substrate 100, and the liquid crystal layer is interposed between the display substrate 100 and the opposite substrate 300.

The curved display device 500 may further include other elements in addition to the display substrate 100 and the opposite substrate 300. In an exemplary embodiment, the curved display device 500 may further include a backlight assembly (not shown) to provide light to the display substrate 100 and the opposite substrate 300, for example, but it should not be limited thereto or thereby.

According to another exemplary embodiment, the curved display device 500 may be an organic electroluminescent display device, for example. In this case, the display substrate 100 includes pixels each including an anode, a cathode, and an organic light emitting layer disposed between the anode and the cathode, and the opposite substrate 300 is coupled to the display substrate 100 to seal the pixels.

In the illustrated exemplary embodiment, a portion or a whole of the curved display device 500 is curved along a first direction D1 on a plane surface, and the first direction D1 is substantially in parallel to a longitudinal direction of the curved display device 500. Accordingly, the display area DA has the curved shape along the first direction D1. In addition, the opposite substrate 300 has the curved shape corresponding to that of the display substrate 100.

As shown in FIG. 1C, when a first point P1 is defined at a curved portion of the display substrate 100 on the side surface of the display substrate 100, a normal line 10 crossing the first point P1 crosses a second point P2 of the opposite substrate 300. In addition, a gaze line 15, which is substantially in parallel to a user's view direction, is defined at the first point P1, and the gaze line 15 crosses a third point P3 of the opposite substrate 300. In this case, since the display substrate 100 and the opposite substrate 300 have the curved shape, the second point P2 may be different from the third point P3 in the opposite substrate 300.

As described above, a phenomenon in which a distance L occurs between the second point P2 and the third point P3 is referred to as a mis-alignment between the display substrate 100 and the opposite substrate 300 due to the curved shape of the display substrate 100 and the opposite substrate 300. Hereinafter, a structure of the curved display device 500, which prevents a display quality of the image displayed in the display area DA of the curved display device 500 from being deteriorated due to the mis-alignment and prevents a horizontal line from occurring, will be described.

Figure 2:
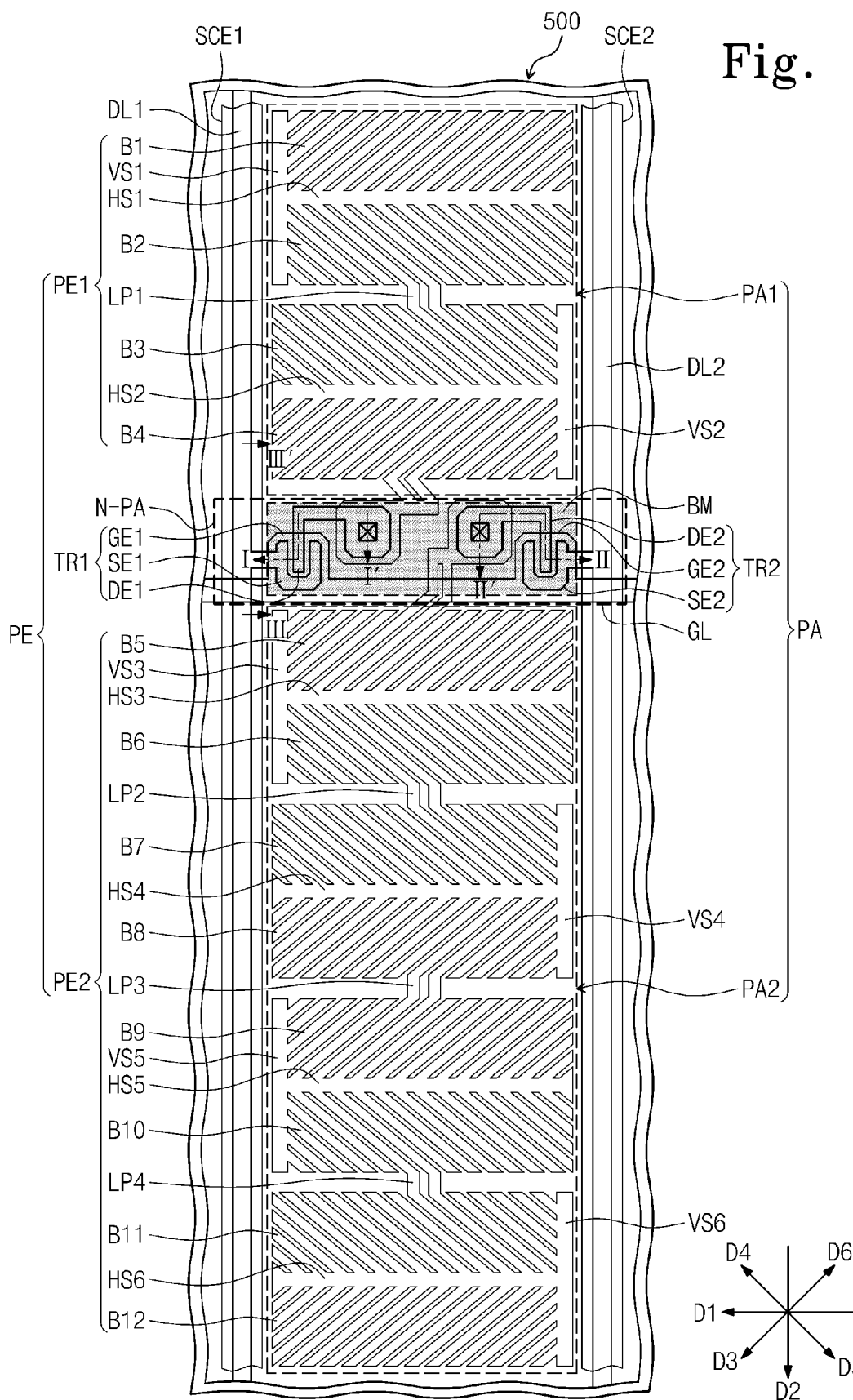
FIG. 2 is a plan view showing a pixel of the curved display device shown in FIG. 1A.
Figure 3A:
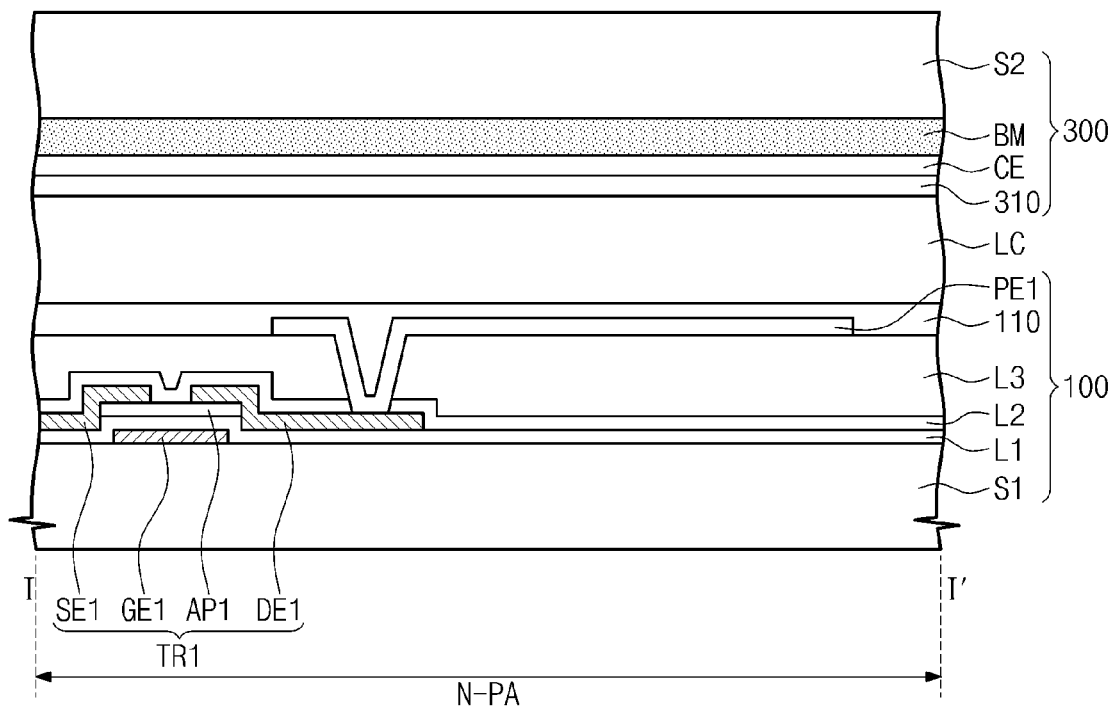
FIG. 3A is a cross-sectional view taken along line I-I' of FIG. 2.
Figure 3B:
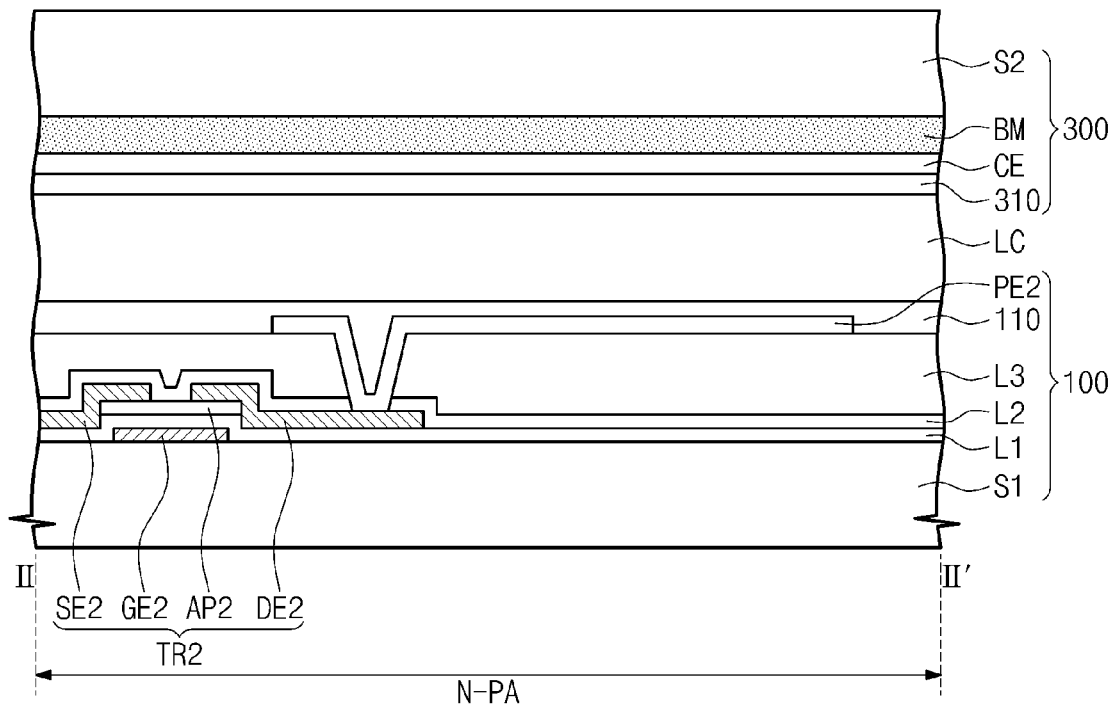
FIG. 3B is a cross-sectional view taken along line II-II' of FIG. 2.
Figure 3C:
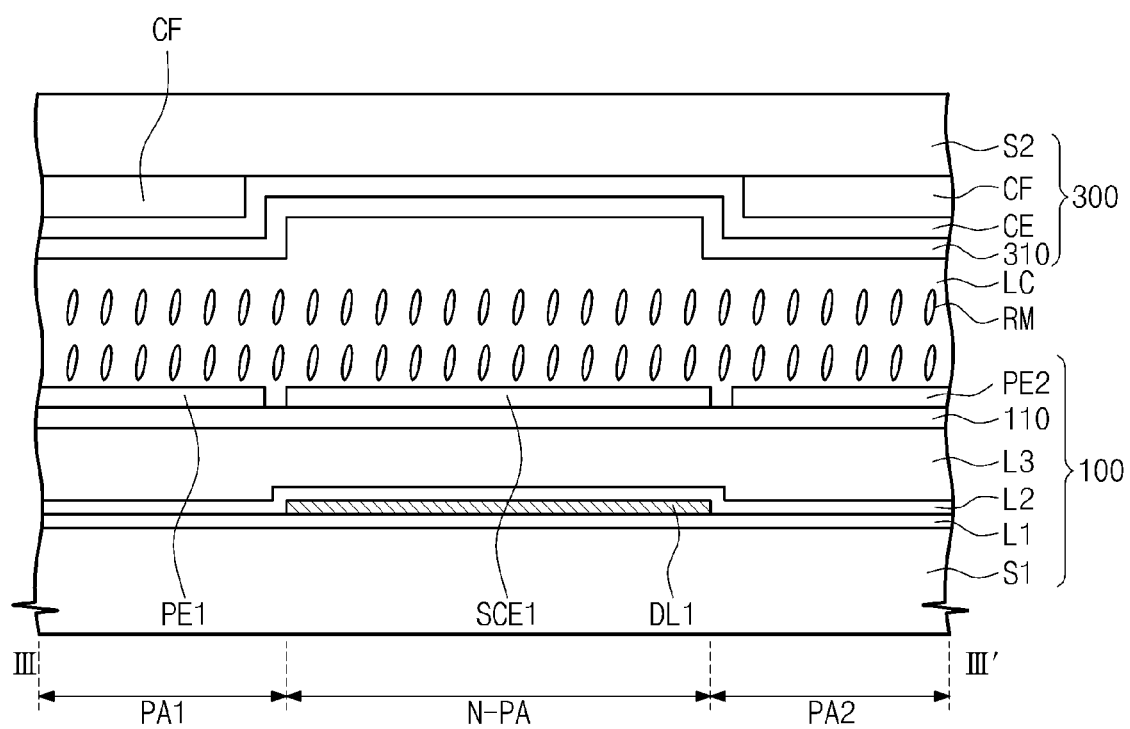
FIG. 3C is a cross-sectional view taken along line III-III' of FIG. 2.

FIG. 2 is a plan view showing a pixel of the curved display device 500 shown in FIG. 1A, FIG. 3A is a cross-sectional view taken along line I-I' of FIG. 2, FIG. 3B is a cross-sectional view taken along line II-II' of FIG. 2, FIG. 3C is a cross-sectional view taken along line III-III' of FIG. 2.

The curved display device 500 includes the pixels arranged in the pixel areas, but only one pixel area PA and a pixel electrode PE disposed in the pixel area PA will be described since the pixels have the same structure and function, and others will be omitted.

Referring to FIGS. 2, 3A, 3B, and 3C, the display substrate 100 includes a first base substrate S1, a gate line GL, a first data line DL1, a second data line DL2, a first thin film transistor ("TFT") TR1, a second TFT TR2, a pixel electrode PE, a first alignment layer 110, a first shielding electrode SCE1, and a second shielding electrode SCE2.

In an exemplary embodiment, the first base substrate S1 may be a glass or plastic substrate, for example. The gate line GL is disposed on the first base substrate S1 and electrically connected to the first and second TFTs TR1 and TR2 to apply a gate signal to the first and second TFTs TR1 and TR2.

In the illustrated exemplary embodiment, the pixel area PA includes a first sub-pixel area PA1 and a second sub-pixel area PA2. In this case, the pixel electrode PE includes a first sub-pixel electrode PE1 disposed in the first sub-pixel area PA1 and a second sub-pixel electrode PE2 disposed in the second sub-pixel area PA2.

The first and second data lines DL1 and DL2 are disposed on the first base substrate S1 and insulated from the gate line GL. The first data line DL1 applies a first data signal to the first TFT TR1 and the second data line DL2 applies a second data signal to the second TFT TR2. The first data line DL1 extends along one side of the first and second sub-pixel electrodes PE1 and PE2 and the second data line DL2 extends along the other side of the first and second sub-pixel electrodes PE1 and PE2.

The first TFT TR1 is electrically connected to the gate line GL, the first data line DL1, and the first sub-pixel electrode PE1. The first TFT TR1 includes a first gate electrode GE1, a first active pattern AP1, a first source electrode SE1, and a first drain electrode DE1. The first gate electrode GE1 is branched from the gate line GL, and the first active pattern AP1 is disposed on the first gate electrode GE1 while a first insulating layer L1 is disposed between the first active pattern AP1 and the first gate electrode GE1. The first source electrode SE1 is branched from the first data line DL1 to overlap with the first active pattern AP1, and the first drain electrode DE1 is spaced apart from the first source electrode SE1 to overlap with the first active pattern AP1.

A second insulating layer L2 covers the first and second TFTs TR1 and TR2 and a third insulating layer L3 is disposed on the second insulating layer L2 to relieve a step difference between the first and second TFTs TR1 and TR2.

The second TFT TR2 is electrically connected to the gate line GL, the second data line DL2, and the second sub-pixel electrode PE2. The second TFT TR2 includes a second gate electrode GE2, a second active pattern AP2, a second source electrode SE2, and a second drain electrode DE2. The second gate electrode GE2 is branched from the gate line GL, and the second active pattern AP2 is disposed on the second gate electrode GE2 while the first insulating layer L1 is disposed between the second active pattern AP2 and the second gate electrode GE2. The second source electrode SE2 is branched from the second data line DL2 to overlap with the second active pattern AP2 and the second drain electrode DE2 is spaced apart from the second source electrode SE2 to overlap with the second active pattern AP2.

The first and second sub-pixel electrodes PE1 and PE2 are disposed on a third insulating layer L3. The first and second sub-pixel electrodes PE1 and PE2 make contact with the first and second drain electrodes DE1 and DE2, respectively, through contact holes defined through the second and third insulating layers L2 and L3.

In the illustrated exemplary embodiment, each of the first and second active patterns AP1 and AP2 may include a semiconductor material, such as amorphous silicon, crystalline silicon, etc., but it should not be limited thereto or thereby. According to another exemplary embodiment, each of the first and second active patterns AP1 and AP2 may include an oxide semiconductor, e.g., indium gallium zinc oxide ("IGZO"), ZnO, $SnO_2$, $In_2O_3$, $Zn_2SnO_4$, $Ge_2O_3$, and $HfO_2$, or a compound semiconductor, e.g., GaAs, GaP, and InP.

When the first and second TFTs TR1 and TR2 are turned on in response to the gate signal, the first data signal is applied to the first sub-pixel electrode PE1 through the turned-on first TFT TR1 and the second data signal is applied to the second sub-pixel electrode PE2 through the turned-on second TFT TR2. Accordingly, when the level of the first data signal is different from the level of the second data signal, different gray scales are displayed in the first and second sub-pixel areas PA1 and PA2, respectively.

In the illustrated exemplary embodiment, the first and second TFTs TR1 and TR2 are connected to the gate line GL, but they should not be limited thereto or thereby. According to another exemplary embodiment, the first and second TFTs TR1 and TR2 may be electrically connected to different gate lines, respectively, in a one-to-one correspondence.

The first alignment layer 110 may be disposed on the first and second sub-pixel electrodes PE1 and PE2 to make contact with the liquid crystal layer LC. When no electric field is applied to the liquid crystal layer LC, liquid crystal molecules RM (refer to FIGS. 4A to 4D) of the liquid crystal layer LC are pre-tilted by the first alignment layer 110. Thus, when the electric field is applied to the liquid crystal layer LC, the liquid crystal molecules pre-tilted by the first alignment layer 110 are aligned in a direction substantially in parallel to the display substrate 100, so that a response time of the liquid crystal molecules operated in response to the electric field may be substantially improved.

The first and second shielding electrodes SCE1 and SCE2 are spaced apart from the first and second sub-pixel electrodes PE1 and PE2 and disposed in the non-pixel area N-PA. The first and second shielding electrodes SCE1 and SCE2 extend in the second direction D2 and are respectively overlapped with the first and second data lines DL1 and DL2.

The first and second shielding electrodes SCE1 and SCE2 may generate the same electric potential with the common electrode CE. In an exemplary embodiment, when a voltage of about 5 volts (V) is applied to the common electrode CE, for example, the voltage of about 5 V is applied to each of the first and second shielding electrodes SCE1 and SCE2, and thus the first and second shielding electrodes SCE1 and SCE2 generate the same electric potential in cooperation with the common electrode CE.

According to the first shielding electrode SCE1, since the first shielding electrode SCE1 generates the same electric potential with the common electrode CE, a difference in electric potential between the first shielding electrode SCE1 and the common electrode CE does not occur. As a result, the liquid crystal molecules RM disposed between the first shielding electrode SCE1 and the common electrode CE are maintained in the alignment state determined by the first and second alignment layers 110 and 310. Accordingly, a phase difference delay value of the light passing through the liquid crystal molecules RM disposed to correspond to the first shielding electrode SCE1 becomes about zero. Therefore, the light may be absorbed by polarizing plates respectively attached to the display substrate 100 and the opposite substrate 300 and having absorption axes vertical to each other.

According to the structure and function of the first and second shielding electrodes SCE1 and SCE2, the first and second shielding electrodes SCE1 and SCE2 may block the light in the non-pixel area N-PA instead of the light blocking layer BM. Therefore, the light blocking layer BM may be omitted in the area of the non-pixel area N-PA, in which the first and second shielding electrodes SCE1 and SCE2 are disposed.

In the illustrated exemplary embodiment, the first and second shielding electrodes SCE1 and SCE2 include a transparent conductive material, e.g., indium tin oxide. Thus, although at least one of the first and second shielding electrodes SCE1 and SCE2 invades the first and second sub-pixel areas PA1 and PA2 due to the mis-alignment described with reference to FIGS. 1A to 1C, an aperture ratio of the first and second sub-pixel areas PA1 and PA2 may be prevented from being deteriorated due to the first and second shielding electrodes SCE1 and SCE2.

The first sub-pixel electrode PE1 includes a first horizontal trunk portion HS1, a second horizontal trunk portion HS2, a first vertical trunk portion VS1, a second vertical trunk portion VS2, and first, second, third, and fourth branch portions B1, B2, B3, and B4.

The first vertical trunk portion VS1 is connected to the first horizontal trunk portion HS1, edges of the first branch portions B1, and edges of the second branch portions B2, and the second vertical trunk portion VS2 is connected to the second horizontal trunk portion HS2, edges of the third branch portions B3, and edges of the fourth branch portions B4.

Each of the first and second vertical trunk portions VS1 and VS2 extends in the second direction D2 crossing the first direction D1. In other words, the second direction D2 may be substantially perpendicular to the first direction D1 when viewed in a plan view.

The first horizontal trunk portion HS1 extends in the first direction D1 and is branched from a center portion of the first vertical trunk portion VS1. The first branch portions B1 have a symmetrical shape to that of the second branch portions B2 with respect to the first horizontal trunk portion HS1. In addition, the second horizontal trunk portion HS2 extends in the first direction D1 and is branched from a center portion of the second vertical trunk portion VS2. The third branch portions B3 have a symmetrical shape to that of the fourth branch portions B4 with respect to the second horizontal trunk portion HS2.

A portion of the first branch portions B1 is branched from the first horizontal trunk portion HS1 and the other portion of the first branch portions B1 is branched from the first vertical trunk portion VS1. In addition, each of the first branch portions B1 extends in a third direction D3 inclined with respect to the first and second directions D1 and D2 when viewed in a plan view and the first branch portions B1 are spaced apart from each other.

A portion of the second branch portions B2 is branched from the first horizontal trunk portion HS1 and the other portion of the second branch portions B2 is branched from the first vertical trunk portion VS1. In addition, each of the second branch portions B2 extends in a fourth direction D4 inclined with respect to the first and second directions D1 and D2 when viewed in a plan view and the second branch portions B2 are spaced apart from each other.

When viewed in a plan view, the fourth direction D4 may cross the third direction D3. In an exemplary embodiment, the third and fourth directions D3 and D4 may be substantially perpendicular to each other when viewed in a plan view, and each of the third and fourth directions D3 and D4 has an angle of about 45 degrees with the first direction D1 or the second direction D2, for example.

A portion of the third branch portions B3 is branched from the second horizontal trunk portion HS2 and the other portion of the third branch portions B3 is branched from the second vertical trunk portion VS2. In addition, each of the third branch portions B3 extends in a fifth direction D5 inclined with respect to the first and second directions D1 and D2 in a plan view and the third branch portions B3 are spaced apart from each other.

A portion of the fourth branch portions B4 is branched from the second horizontal trunk portion HS2 and the other portion of the fourth branch portions B4 is branched from the second vertical trunk portion VS2. In addition, each of the fourth branch portions B4 extends in a sixth direction D6 inclined with respect to the first and second directions D1 and D2 in a plan view and the fourth branch portions B4 are spaced apart from each other.

When viewed in a plan view, the sixth direction D6 may cross the fifth direction D5. In an exemplary embodiment, the fifth and sixth directions D5 and D6 may be substantially perpendicular to each other when viewed in a plan view, and each of the fifth and sixth directions D5 and D6 has an angle of about 45 degrees with the first direction D1 or the second direction D2, for example.

In an exemplary embodiment, the second sub-pixel electrode PE2 may have a size different from a size of the first sub-pixel electrode PE1, but the invention is not limited thereto, and the second sub-pixel electrode PE2 may have a shape similar to a shape of the first sub-pixel electrode PE1.

The second sub-pixel electrode PE2 includes third, fourth, fifth, and sixth horizontal trunk portions HS3, HS4, HS5, and HS6, third, fourth, fifth, and sixth vertical trunk portions VS3, VS4, VS5, and VS6, and fifth, sixth, seventh, eighth, ninth, tenth, eleventh, and twelfth branch portions B5, B6, B7, B8, B9, B10, B11, and B12.

Hereinafter, a structure in which the first vertical trunk portion VS1, the first horizontal trunk portion HS1, the first branch portions B1, and the second branch portions B2 are coupled to each other is referred to as a first structure, and a structure in which the second vertical trunk portion VS2, the second horizontal trunk portion HS2, the third branch portions B3, and the fourth branch portions B4 are coupled to each other is referred to as a second structure.

The third vertical trunk portion VS3, the third horizontal trunk portion HS3, the fifth branch portions B5, and the sixth branch portions B6 are coupled to each other in the first structure, and the fifth vertical trunk portion VS5, the fifth horizontal trunk portion HS5, the ninth branch portions B9, and the tenth branch portions B10 are coupled to each other in the first structure. In addition, the fourth vertical trunk portion VS4, the fourth horizontal trunk portion HS4, the seventh branch portions B7, and the eighth branch portions B8 are coupled to each other in the second structure, and the sixth vertical trunk portion VS6, the sixth horizontal trunk portion HS6, the eleventh branch portions B11, and the twelfth branch portions B12 are coupled to each other in the second structure.

When the first to twelfth branch portions B1 to B12 have the above-mentioned structure, a first domain DMN1 (refer to FIG. 5) is defined in the first sub-pixel area PA1 and a second domain DMN2 (refer to FIG. 5) is defined in the second sub-pixel area PA2. In addition, the first domain DMN1 includes first, second, third, and fourth unit domains DM1, DM2, DM3, and DM4 (refer to FIG. 5) sequentially arranged in the second direction DR2 and the second domain DMN2 includes fifth, sixth, seventh, and eighth unit domains DM5, DM6, DM7, and DM8 (refer to FIG. 5) sequentially arranged twice in the second direction DR2.

The first sub-pixel electrode PE1 further includes a first domain connection part LP1 and the second sub-pixel electrode PE2 further includes second, third, and fourth domain connection parts LP2, LP3, and LP4. The first domain connection part LP1 connects the second and third branch portions B2 and B3 and the second domain connection part LP2 connects the sixth and seventh branch portions B6 and B7. The third domain connection part LP3 connects the eighth and ninth branch portions B8 and B9 and the fourth domain connection part LP4 connects the tenth and eleventh branch portions B10 and B11.

The opposite substrate 300 includes a second base substrate S2, a common electrode CE, the light blocking layer BM, the color filter CF, and the second alignment layer 310. In an exemplary embodiment, the second base substrate S2 may be a glass or plastic substrate, for example.

The common electrode CE is disposed on the second base substrate S2 to generate the electric field applied to the liquid crystal layer LC in cooperation with the pixel electrode PE. The light blocking layer BM is disposed on the second base substrate S2 to block the light exiting from the liquid crystal layer LC. The light blocking layer BM is disposed in the non-pixel area N-PA disposed between the first sub-pixel area PA1 and the second sub-pixel area PA2, and extends in the first direction D1.

The color filter CF is disposed on the second base substrate S2 corresponding to the first and second sub-pixel areas PA1 and PA2 to filter the light exiting from the liquid crystal layer LC to a color light. In the illustrated exemplary embodiment, the color filter CF is disposed on the second base substrate S2, but it should not be limited thereto or thereby. According to another exemplary embodiment, the color filter CF may be disposed on the first base substrate S1 to correspond to the first and second sub-pixel areas PA1 and PA2.

The second alignment layer 310 is disposed on the common electrode CE to make contact with the liquid crystal layer LC. When no electric field is applied to the liquid crystal layer LC, the liquid crystal molecules RM (refer to FIGS. 4A to 4D) of the liquid crystal layer LC are pre-tilted by the second alignment layer 310. Thus, when the electric field is applied to the liquid crystal layer LC, the liquid crystal molecules pre-tilted by the second alignment layer 310 are aligned in a direction substantially in parallel to the opposite substrate 300, and thus a response time of the liquid crystal molecules operated in response to the electric field may be substantially improved.

Figure 4A:
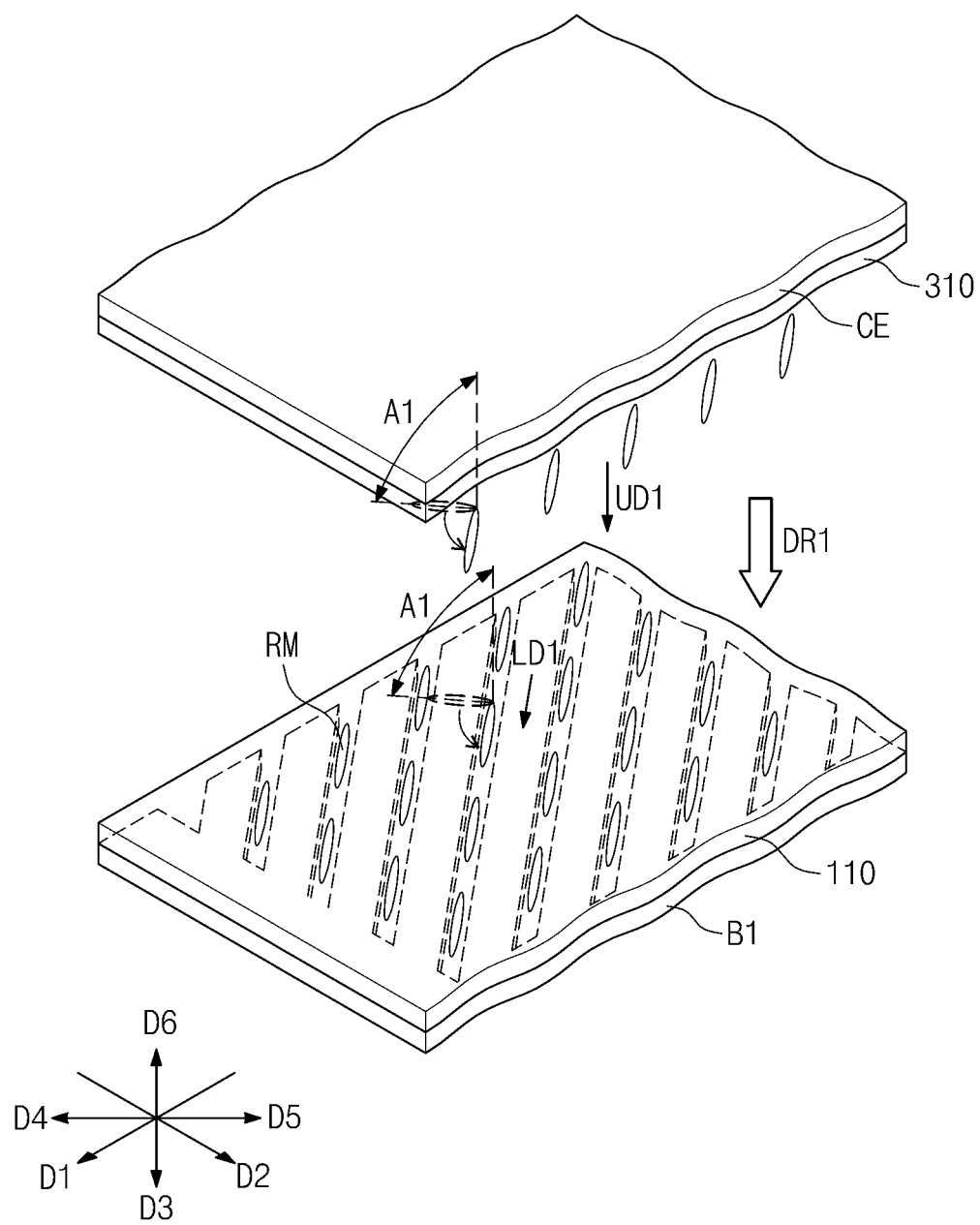
FIGS. 4A to 4D are perspective views showing liquid crystal molecules aligned by an electric field generated between a display substrate and an opposite substrate.
Figure 4B:
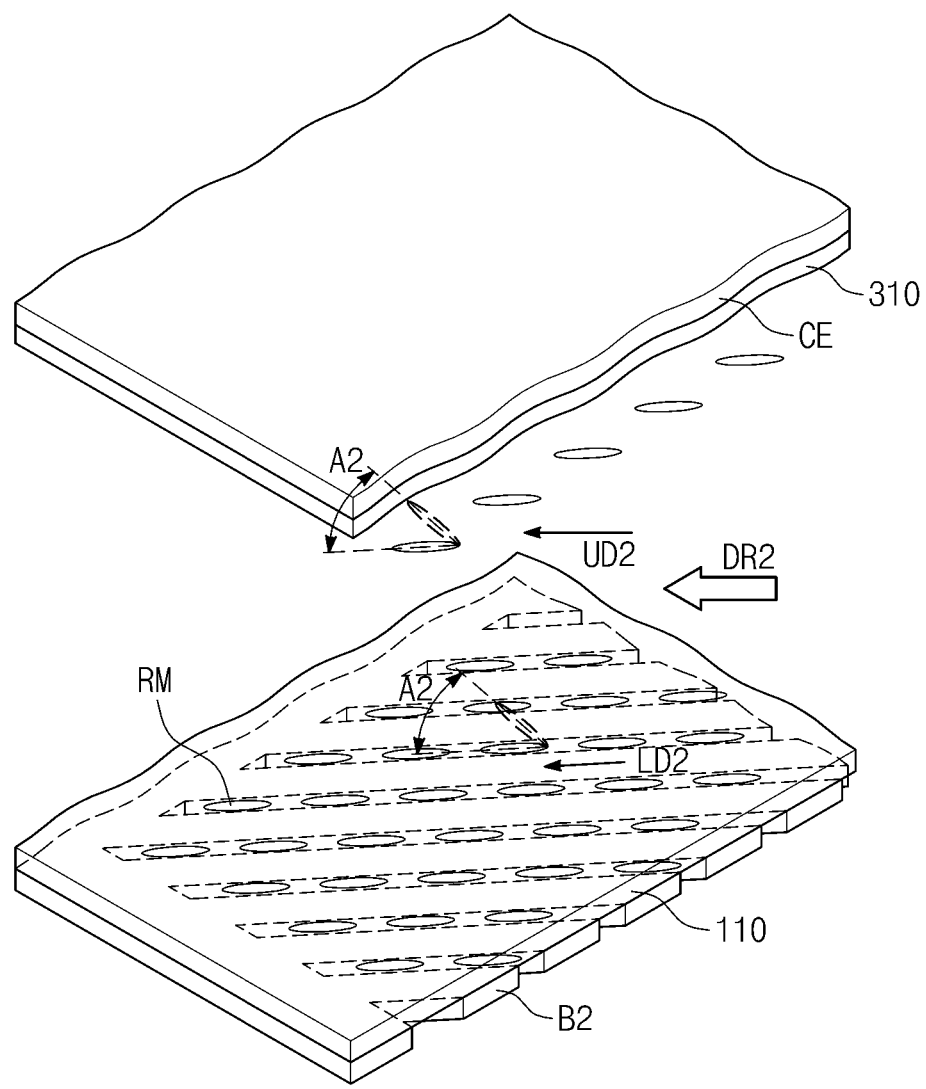
Figure 4B:
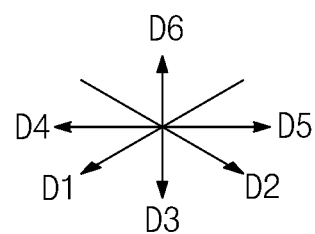
Figure 4C:
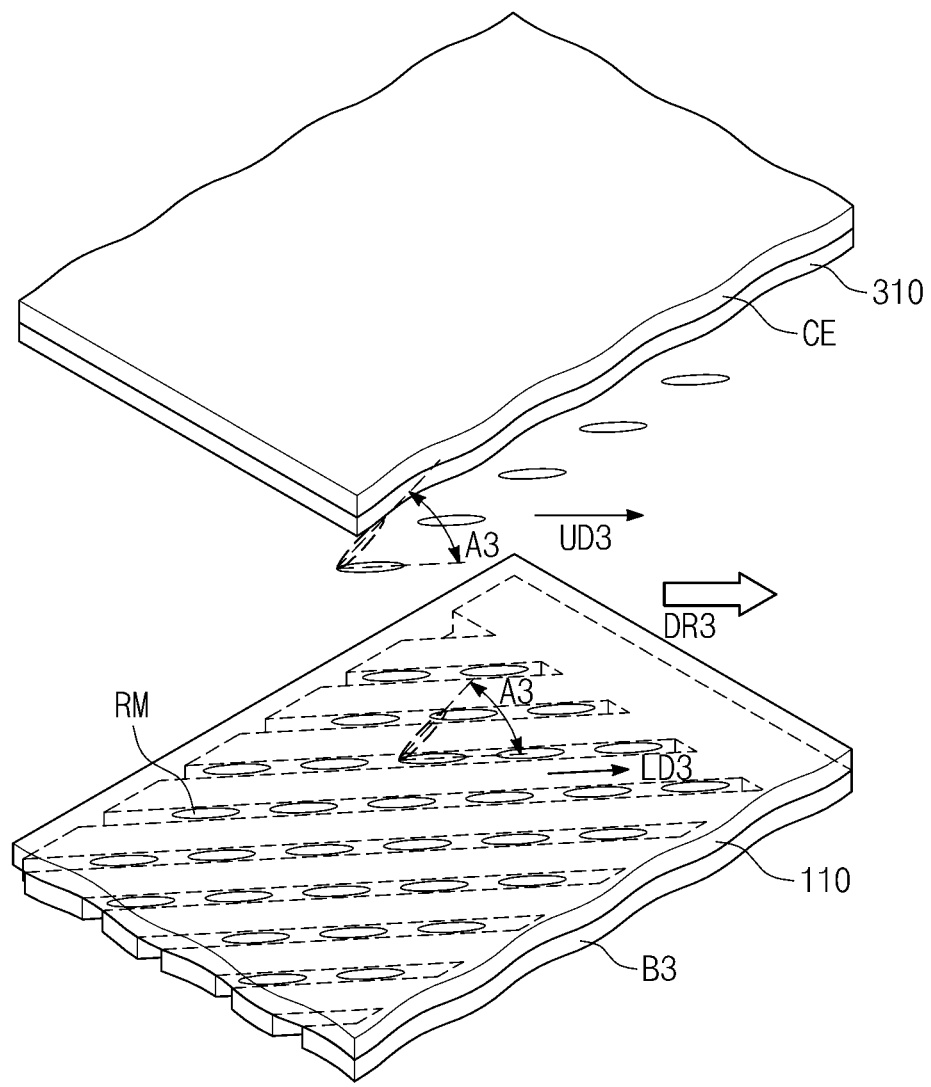
Figure 4C:
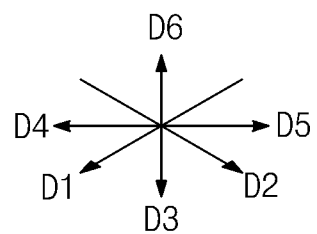
Figure 4D:
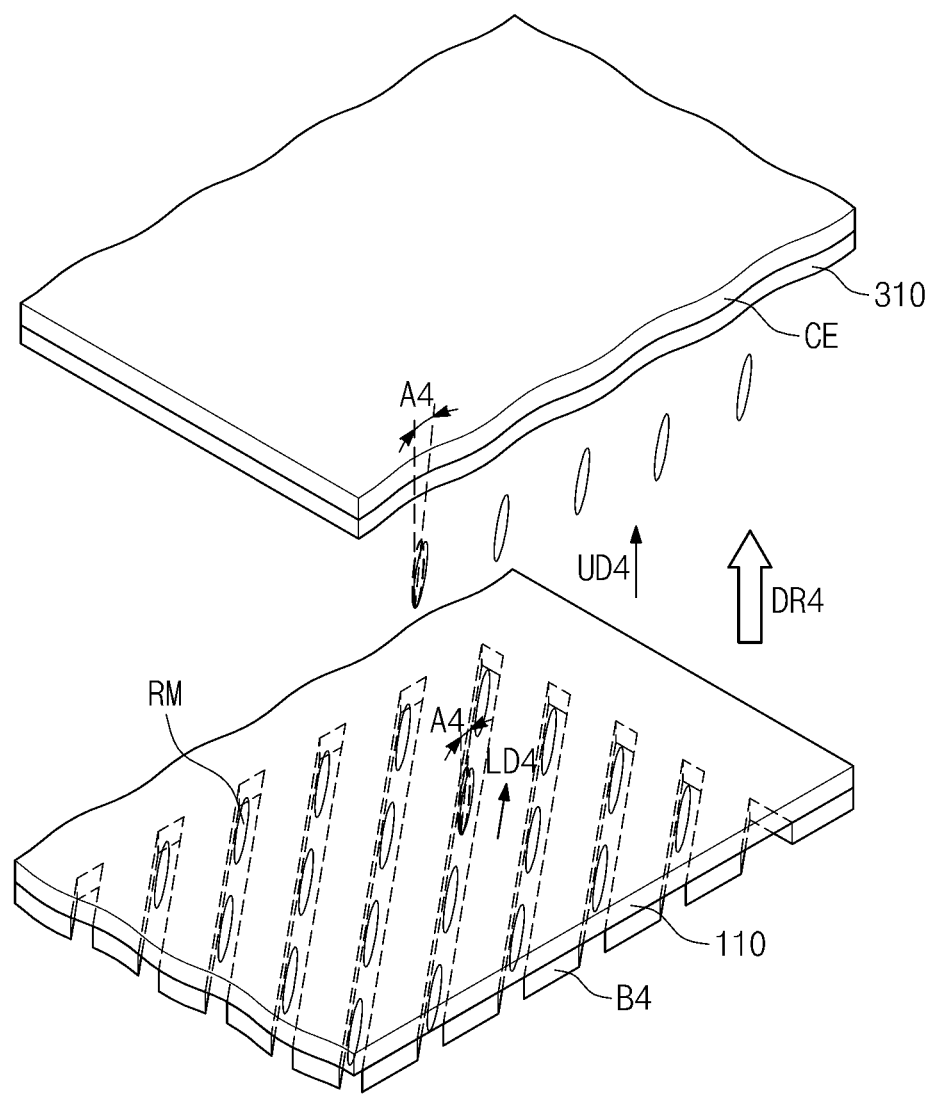
Figure 5:
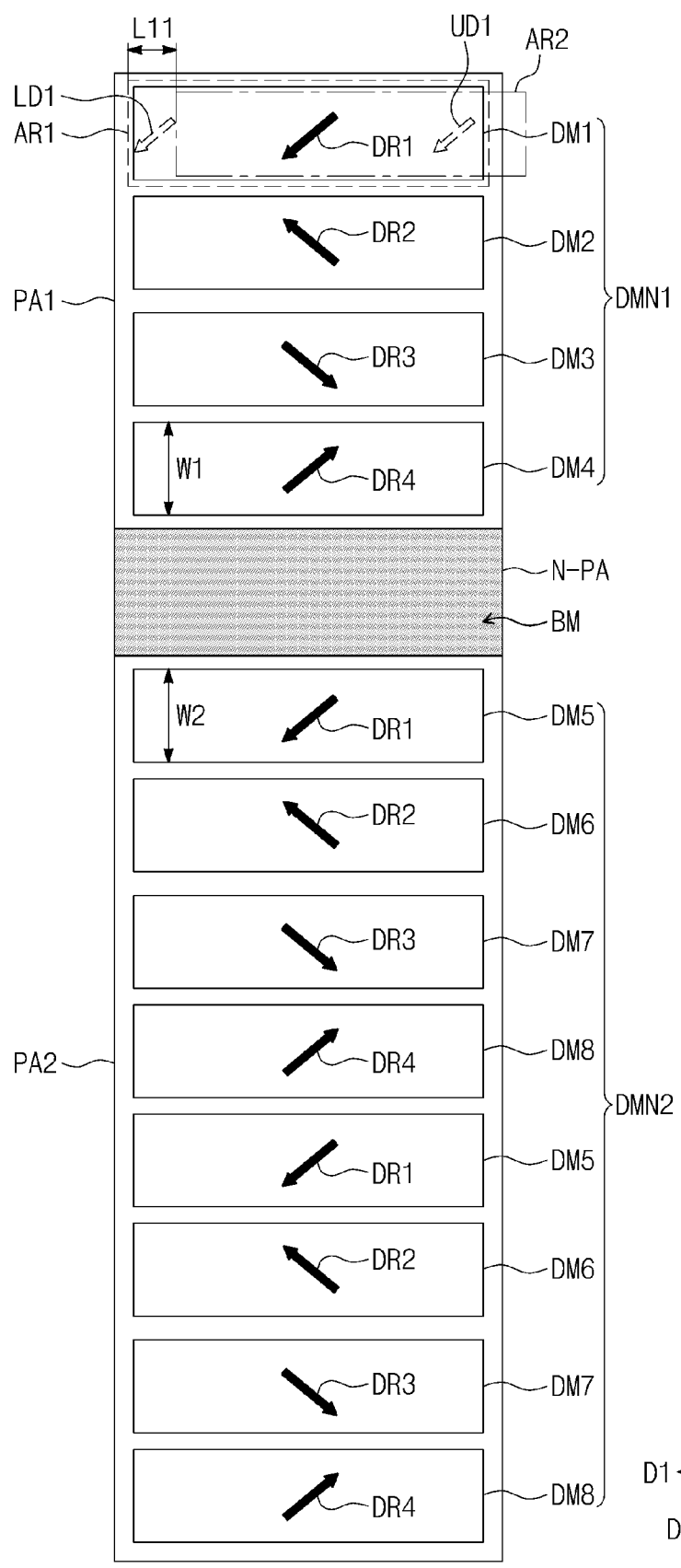
FIG. 5 is a view showing domains and liquid crystal alignment directions defined in a pixel area shown in FIG. 2.
Figure 5:
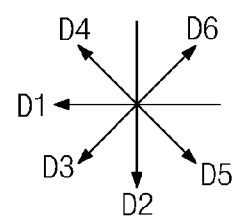

FIGS. 4A to 4D are perspective views showing the liquid crystal molecules aligned by the electric field generated between the display substrate and the opposite substrate and FIG. 5 is a view showing the domains and the liquid crystal alignment directions defined in the pixel area shown in FIG. 2.

In more detail, FIG. 4A is a perspective view showing an alignment state of the liquid crystal molecules disposed in the first branch portions B1, FIG. 4B is a perspective view showing an alignment state of the liquid crystal molecules disposed in the second branch portions B2, FIG. 4C is a perspective view showing an alignment state of the liquid crystal molecules disposed in the third branch portions B3, and FIG. 4D is a perspective view showing an alignment state of the liquid crystal molecules disposed in the fourth branch portions B4.

Referring to FIGS. 4A and 5, the first branch portions B1 extend in the third direction D3. When no electric field is generated between the display substrate 100 (refer to FIG. 3A) and the opposite substrate 300 (refer to FIG. 3A), a portion of the liquid crystal molecules RM, which is adjacent to the first alignment layer 110, is aligned and inclined at a first pre-tilt angle A1 by the first alignment layer 110 and a portion of the liquid crystal molecules RM, which is adjacent to the second alignment layer 310, is aligned and inclined at the first pre-tilt angle A1 by the second alignment layer 310.

When a direction in which the liquid crystal molecules RM are aligned by the first alignment layer 110 on a plane surface is referred to as a first lower alignment direction LD1 and a direction in which the liquid crystal molecules RM are aligned by the second alignment layer 310 on a plane surface is referred to as a first upper alignment direction UD1, the first upper alignment direction UD1 and the first lower alignment direction LD1 are substantially in parallel to the third direction D3. That is, the first lower alignment direction LD1 and the first upper alignment direction UD1 are the same.

When the electric field is generated, the liquid crystal molecules RM are more inclined by the electric field, the liquid crystal molecules are aligned in the third direction D3 to be substantially in parallel to the first branch portions B1 when viewed in a plan view. That is, the liquid crystal molecules pre-tilted by the first and second alignment layers 110 and 130 are more inclined to the third direction D3 by the electric field.

Different from the illustrated exemplary embodiment, when the first upper alignment direction UD1 is different from the first lower alignment direction LD1, the liquid crystal molecules RM disposed adjacent to the first and second alignment layers 110 and 310 may be aligned in and inclined to different directions. In this case, the number of the liquid crystal molecules RM aligned in the third direction D3 by the electric field may be reduced, and thus an alignment defect occurs. However, according to the illustrated exemplary embodiment, the first upper alignment direction UD1 is substantially the same as the first lower alignment direction LD1 and the liquid crystal molecules RM are aligned in and inclined to the same direction. Therefore, the alignment defect may be prevented from occurring.

Accordingly, when an area in which the liquid crystal molecules RM are aligned by the first branch portions B1 is referred to as the first unit domain DM1 and a direction in which the liquid crystal molecules RM are aligned by the electric field in the first unit domain DM1 is referred to as a first liquid crystal alignment direction DR1, the first liquid crystal alignment direction DR1 in the first unit domain DM1 may correspond to the third direction D3, which is the same as the first lower alignment direction LD1 and the first upper alignment direction UD1.

Referring to FIGS. 4B and 5, the second branch portions B2 extend in the fourth direction D4. When no electric field is generated between the display substrate 100 (refer to FIG. 3A) and the opposite substrate 300 (refer to FIG. 3A), a portion of the liquid crystal molecules RM, which is disposed adjacent to the first alignment layer 110, is aligned and inclined at a second pre-tilt angle A2 by the first alignment layer 110, and a portion of the liquid crystal molecules RM, which is disposed adjacent to the second alignment layer 310, is aligned and inclined at the second pre-tilt angle A2 by the second alignment layer 310.

When a direction in which the liquid crystal molecules RM are aligned by the first alignment layer 110 when viewed in a plan view is referred to as a second lower alignment direction LD2 and a direction in which the liquid crystal molecules RM are aligned by the second alignment layer 310 when viewed in a plan view is referred to as a second upper alignment direction UD2, the second upper alignment direction UD2 and the second lower alignment direction LD2 are substantially in parallel to the fourth direction D4. That is, the second lower alignment direction LD2 and the second upper alignment direction UD2 are the same.

When the electric field is generated, the liquid crystal molecules RM are more inclined by the electric field, and thus the liquid crystal molecules RM are aligned in the fourth direction D4 to be substantially in parallel to the second branch portions B2 when viewed in a plan view. Therefore, the second upper alignment direction UD2 and the second lower alignment direction LD2 are the same and the liquid crystal molecules RM are aligned in the same direction in response to the electric field. As a result, a second liquid crystal alignment direction DR2 in the second unit domain DM2 may correspond to the fourth direction D3, which is the same as the second upper alignment direction UD2 and the second lower alignment direction LD2.

Referring to FIGS. 4C and 5, the third branch portions B3 extend in the fifth direction D5. When no electric field is generated between the display substrate 100 (refer to FIG. 3A) and the opposite substrate 300 (refer to FIG. 3A), a portion of the liquid crystal molecules RM, which is disposed adjacent to the first alignment layer 110, is aligned and inclined at a third pre-tilt angle A3 by the first alignment layer 110 and a portion of the liquid crystal molecules RM, which is disposed adjacent to the second alignment layer 310, is aligned and inclined at the third pre-tilt angle A3 by the second alignment layer 310.

When a direction in which the liquid crystal molecules RM are aligned by the first alignment layer 110 when viewed in a plan view is referred to as a third lower alignment direction LD3 and a direction in which the liquid crystal molecules RM are aligned by the second alignment layer 310 when viewed in a plan view is referred to as a third upper alignment direction UD3, the third upper alignment direction UD3 and the third lower alignment direction LD3 are substantially in parallel to the fifth direction D5. That is, the third lower alignment direction LD3 and the third upper alignment direction UD3 are the same.

When the electric field is generated, the liquid crystal molecules RM are more inclined by the electric field, and thus the liquid crystal molecules RM are aligned in the fifth direction D5 to be substantially in parallel to the third branch portions B3 when viewed in a plan view. Therefore, the third upper alignment direction UD3 and the third lower alignment direction LD3 are the same and the liquid crystal molecules RM are aligned in the same direction in response to the electric field. As a result, a third liquid crystal alignment direction DR3 in the third unit domain DM3 may correspond to the fifth direction D5, which is the same as the third upper alignment direction UD3 and the third lower alignment direction LD3.

Referring to FIGS. 4D and 5, the fourth branch portions B4 extend in the sixth direction D6. When no electric field is generated between the display substrate 100 (refer to FIG. 3A) and the opposite substrate 300 (refer to FIG. 3A), a portion of the liquid crystal molecules RM, which is disposed adjacent to the first alignment layer 110, is aligned and inclined at a fourth pre-tilt angle A4 by the first alignment layer 110 and a portion of the liquid crystal molecules RM, which is disposed adjacent to the second alignment layer 310, is aligned and inclined at the fourth pre-tilt angle A4 by the second alignment layer 310.

When a direction in which the liquid crystal molecules RM are aligned by the first alignment layer 110 when viewed in a plan view is referred to as a fourth lower alignment direction LD4 and a direction in which the liquid crystal molecules RM are aligned by the second alignment layer 310 when viewed in a plan view is referred to as a fourth upper alignment direction UD4, the fourth upper alignment direction UD4 and the fourth lower alignment direction LD4 are substantially in parallel to the sixth direction D6. That is, the fourth lower alignment direction LD4 and the fourth upper alignment direction UD4 are the same.

When the electric field is generated, the liquid crystal molecules RM are more inclined by the electric field, and thus the liquid crystal molecules RM are aligned in the sixth direction D6 to be substantially in parallel to the fourth branch portions B4 when viewed in a plan view. Therefore, the fourth upper alignment direction UD4 and the fourth lower alignment direction LD4 are the same and the liquid crystal molecules RM are aligned in the same direction in response to the electric field. As a result, a fourth liquid crystal alignment direction DR4 in the fourth unit domain DM4 may correspond to the sixth direction D6, which is the same as the fourth upper alignment direction UD4 and the fourth lower alignment direction LD4.

According to the above, the first domain DMN1 is defined in the first sub-pixel area PA1 and the first domain DMN1 includes the first to fourth unit domains DM1 to DM4 sequentially arranged in the second direction D2. In this case, the liquid crystal alignment directions in which the liquid crystal molecules RM are aligned are different from each other in the first to fourth domains DM1 to DM4. Accordingly, a viewing angle with respect to the first sub-pixel area PA1 may be widened. In addition, although the electric field is not generated, the alignment defect does not occur in the first to fourth domains DM1 to DM4 since the directions in which the liquid crystal molecules RM are aligned by the first alignment layer 110 in the first to fourth domains DM1 to DM4 are substantially the same as the direction in which the liquid crystal molecules RM are aligned by the second alignment layer 310 in the first to fourth domains DM1 to DM4.

Similar to the first sub-pixel area PA1, a second domain DM2 is defined in the second sub-pixel area PA2 and the second domain DMN2 includes fifth to eighth unit domains DM5 to DM8 sequentially arranged twice in the second direction D2.

Liquid crystal alignment directions in which the liquid crystal molecules are aligned in response to the electric field in the fifth to eighth unit domains DM5 to DM8 are different from each other. In addition, although the electric field is not generated, the alignment defect does not occur in the fifth to eighth domains DM5 to DM8 since the directions in which the liquid crystal molecules RM are aligned by the first alignment layer 110 in the fifth to eighth domains DM5 to DM8 are substantially the same as the direction in which the liquid crystal molecules RM are aligned by the second alignment layer 310 in the fifth to eighth domains DM5 to DM8.

Hereinafter, the effect generated when the first to eighth domains DM1 to DM8 are defined in the first and second sub-pixel areas PA1 and PA2 will be described in detail with reference to the first unit domain DM1.

Referring to FIGS. 1C, 4A, and 5, the mis-alignment occurs between the display substrate 100 and the opposite substrate 300 when the curved display device 500 is curved along the first direction D1. Due to the mis-alignment, the display substrate 100 and the opposite substrate 300 may be dislocated to each other by a first length L11 along the first direction D1. However, since the first to eighth unit domains DM1 to DM8 are arranged in the second direction D2 substantially vertical to the first direction D1 according to the illustrated exemplary embodiment, the alignment defect does not occur in the first domain DM1, which is caused by the mis-alignment.

In more detail, when an area in which the liquid crystal molecules RM are aligned by the first alignment layer 110 disposed on the display substrate 100 is referred to as a lower alignment area AR1 and an area in which the liquid crystal molecules RM are aligned by the second alignment layer 310 disposed on the opposite substrate 300 is referred to as an upper alignment area AR2, the liquid crystal molecules RM are aligned in the first lower alignment direction LD1 in the lower alignment area AR1, and are aligned in the first upper alignment direction UD1 in the upper alignment area AR2. In this case, when the opposite substrate 300 is shifted by the first length L11 due to the mis-alignment, a position of the lower alignment area AR1 substantially matches with a position of the first domain DM1, but a position of the upper alignment area AR2 is shifted to the first direction D1 from the position of the first domain DM1 by the first length L11.

In the illustrated exemplary embodiment, even though the opposite substrate 300 is shifted and the position of the lower alignment area AR1 does not partially match with the position of the upper alignment area AR2, the lower alignment area AR1 is overlapped with the upper alignment area AR2 in the first unit domain DM1. That is, the lower alignment area AR1 is not overlapped with other upper alignment areas aligned in a direction different from that of the upper alignment area AR2.

Therefore, the alignment defect may be prevented from occurring due to the overlap between the upper alignment area and the lower alignment area, which are aligned in different directions, and thus a transmittance of the light passing through the first unit domain DM1 may be prevented from being deteriorated.

When a width of each of the first to fourth unit domains DM1 to DM4, which is substantially in parallel to the second direction D2, is referred to as a first width W1 and a width of each of the fifth to eighth unit domains DM5 to DM8, which is substantially in parallel to the second direction D2, is referred to as a second width W2, the first width W1 may be substantially the same as the second width W2.

Accordingly, when the size of the second sub-pixel area PA2 is greater than the size of the first sub-pixel area PA1, the number of the unit domains defined in the second domain DMN2 is greater than the number of the unit domains defined in the first domain DMN1. In the illustrated exemplary embodiment, the number of each of the first to fourth unit domains DM1 to DM4 defined in the first sub-pixel area PA1 may be one, and the number of each of the fifth to eighth unit domains DM5 to DM8 defined in the second sub-pixel area PA2 may be two. Therefore, four unit domains are defined in the first sub-pixel area PA1 and eight unit domains are defined in the second sub-pixel area PA2, for example.

According to another exemplary embodiment, the number of each of the first to fourth unit domains DM1 to DM4 may be "n" (n is a natural number equal to or greater than 2) in accordance with a size ratio between the first and second sub-pixel areas PA1 and PA2 and the number of each of the fifth to eighth unit domains DM5 to DM8 may be "m" (m is a natural number equal to or greater than 2) in accordance with the size ratio between the first and second sub-pixel areas PA1 and PA2.

Hereinafter, the effect generated when the first width W1 is equal to the second width W2 will be described in detail with reference to FIGS. 6 and 7.

Figure 6:
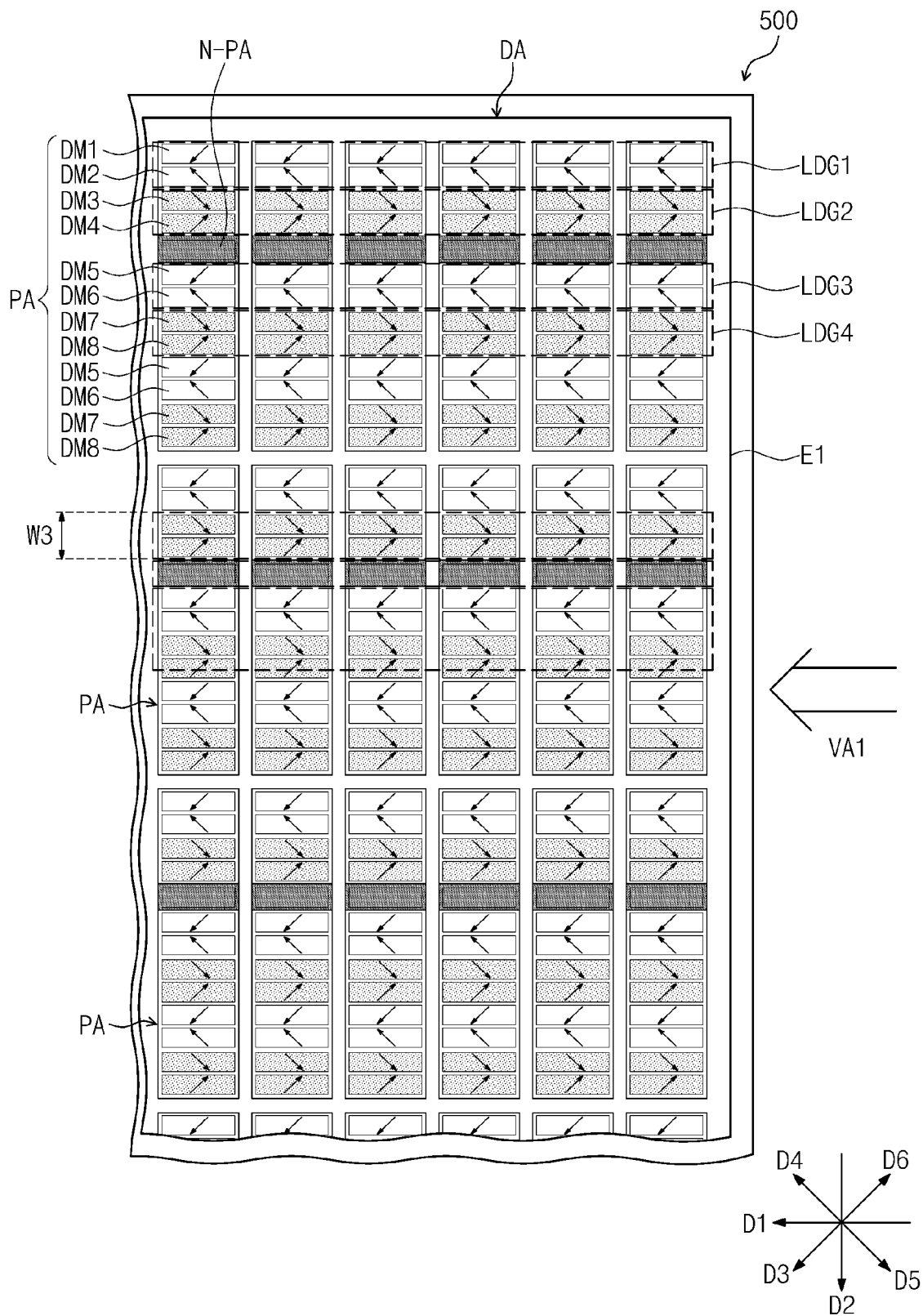
FIG. 6 is an enlarged view showing a portion of a display area of the curved display device shown in FIG. 1B.

FIG. 6 is an enlarged view showing a portion of the display area of the curved display device shown in FIG. 1B. In detail, FIG. 6 shows a first side E1 of the display area DA.

Referring to FIGS. 5 and 6, the pixel areas PA and the non-pixel area N-PA are defined in the display area DA of the display device 500. As described with reference to FIG. 5, the first to eighth unit domains DM1 to DM8 are defined in each of the pixel areas PA. The pixel areas PA are arranged in a matrix form.

A first line domain group LDG1 including the first and second unit domains DM1 and DM2 arranged in the first direction D1, a second line domain group LDG2 including the third and fourth unit domains DM3 and DM4 arranged in the first direction D1, a third line domain group LDG3 including the fifth and sixth unit domains DM5 and DM6 arranged in the first direction D1, and a fourth line domain group LDG4 including the seventh and eighth unit domains DM7 and DM8 arranged in the first direction D1 are defined along the second direction D2. In this case, each of the first to fourth line domain groups LDG1 to LDG4 has a band shape having a third width W3 along the second direction D2, and the third width W3 is two times greater than the first width W1 (refer to FIG. 5) or the second width W2 (refer to FIG. 5).

The liquid crystal alignment directions DR3 and DR4 (refer to FIG. 5) are toward the first side E1 of the display area DA in each of the second and fourth line domain groups LDG2 and LDG4. On the contrary, the liquid crystal alignment directions DR1 and DR2 (refer to FIG. 5) are toward a second side E2 (refer to FIG. 7) opposite to the first side E1 in each of the first and third line domain groups LDG1 and LDG3.

Therefore, a refractive anisotropy of the liquid crystal molecules disposed in the first and third line domain groups LDG1 and LDG3 may be different from a refractive anisotropy of the liquid crystal molecules disposed in the second and fourth line domain groups LDG2 and LDG4 in accordance with the viewing angle at which the user sees the display area DA. As a result, although the curved display device 500 is operated such that the image is displayed in the pixel areas PA at the same brightness, the brightness of the image displayed in the first and third line domain groups LDG1 and LDG3 may be different from the brightness of the image displayed in the second and fourth line domain groups LDG2 and LDG4 according to the viewing angle. In an exemplary embodiment, as shown in FIG. 6, when the user sees the display area DA at a first viewing angle VA1, the brightness of the image displayed in the second and fourth line domain groups LDG2 and LDG4 may be lower than the brightness of the image displayed in the first and third line domain groups LDG1 and LDG3, for example.

As described above, the brightness of the image displayed in the first to fourth line domain groups LDG1, LDG2, LDG3, and LDG4 becomes lower in accordance with the viewing angle, but a horizontal line may be prevented from being perceived in the display area DA since the following first and second effects are generated in accordance with the features in structure.

Since the first to fourth line domain groups LDG1 to LDG4 are sequentially arranged, the second and fourth line domain groups LDG2 and LDG4, in which the image having a relative low brightness is displayed among the first to fourth line domain groups LDG1 to LDG4, are not disposed adjacent to each other. Therefore, the first effect that prevents the horizontal line from being perceived may occur. Different from the illustrated exemplary embodiment, when the second and fourth line domain groups LDG2 and LDG4 are disposed adjacent to each other, the width of the second and fourth line domain groups LDG2 and LDG4 becomes two times greater than the third width W3 in the display area DA. As a result, the horizontal line is perceived in the display area DA. However, according to the illustrated exemplary embodiment, the second and fourth line domain groups LDG2 and LDG4 are spaced apart from each other and the width of each of the second and fourth line domain groups LDG2 and LDG4 corresponds to the third width W3. Consequently, each of the second and fourth line domain groups LDG2 and LDG4 may be prevented from being perceived as the horizontal line.

Further, since the first to fourth line domain groups LDG1 to LDG4 have the same width, the second effect that prevents the horizontal line from being perceived may occur. Different from the illustrated exemplary embodiment, when the width of each of the second and fourth line domain groups LDG2 and LDG4 is greater than the width of each of the first and third line domain groups LDG1 and LDG3, the user may perceive the second and fourth line domain groups LDG2 and LDG4, in which the image having the relatively low brightness is displayed, as the horizontal line. However, according to the illustrated exemplary embodiment, the first to fourth line domain groups LDG1 to LDG4 have the same width and are regularly arranged, and thus the degree, in which the second and fourth line domain groups LDG2 and LDG4 are perceived to the user as the horizontal line, becomes weak.

In addition, when the third width W3 is designed to have a value, which is not perceivable by the user, in consideration of a distance between the curved display device 300 and the user, the degree, in which the second and fourth line domain groups LDG2 and LDG4 are perceived by the user as the horizontal line, becomes weaker. In an exemplary embodiment, when the distance between the curved display device 300 and the user is about 30 centimeters and the third width W3 is about 100 micrometers, for example, the degree, in which the second and fourth line domain groups LDG2 and LDG4 are perceived to the user as the horizontal line, becomes weaker.

Figure 7:
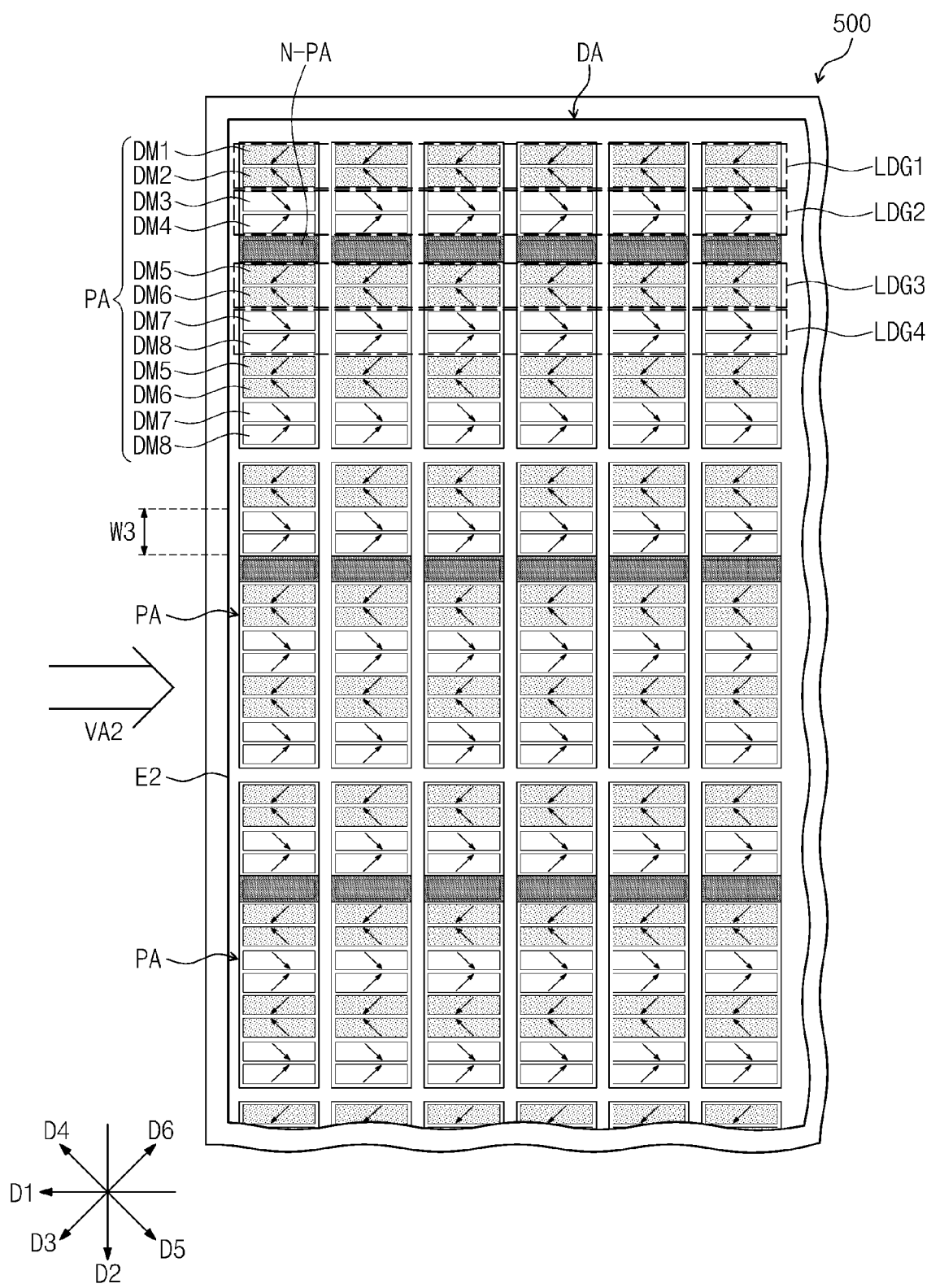
FIG. 7 is an enlarged view showing a portion of a display area of the curved display device shown in FIG. 1B.

FIG. 7 is an enlarged view showing a portion of the display area of the curved display device shown in FIG. 1B. In detail, FIG. 7 shows the second side E2 of the display area DA.

Referring to FIGS. 5 and 7, when the user sees the display area DA at a second viewing angle VA2, the brightness of the image displayed in the first and third line domain groups LDG1 and LDG3 may be lower than the brightness of the image displayed in the second and fourth line domain groups LDG2 and LDG4.

However, since the first and third line domain groups LDG1 and LDG3 are not disposed adjacent to each other among the first to fourth line domain groups LDG1 to LDG4, the above-described first effect may occur. In addition, the first to fourth line domain groups LDG1 to LDG4 have the same width, so that the second effect described with reference to FIG. 6 may occur. Accordingly, the display quality of the curved display device 500 may be prevented from being lowered due to the horizontal line.

Figure 8:
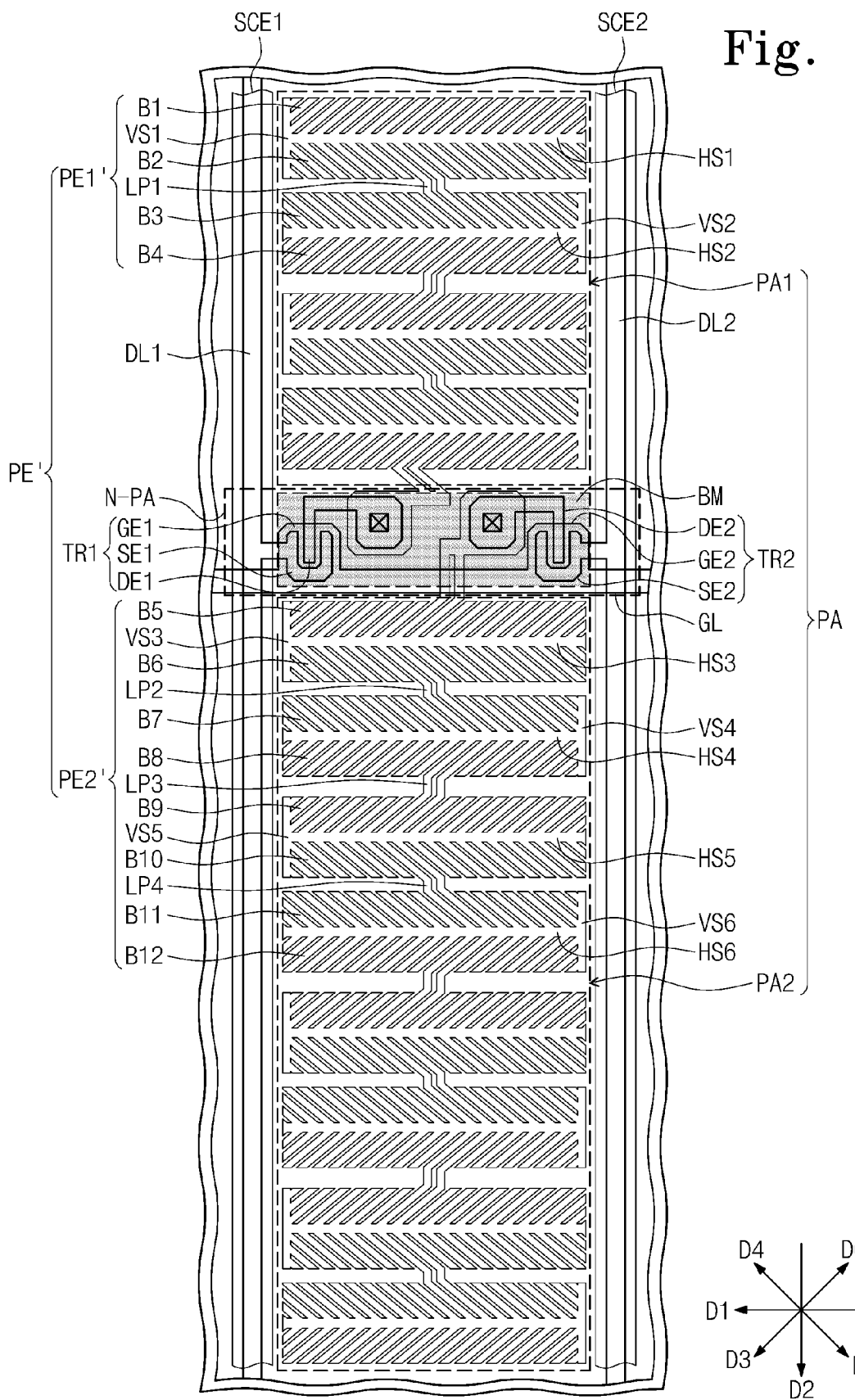
FIG. 8 is a plan view showing another exemplary embodiment of a pixel of a curved display device according to the invention.
Figure 9:
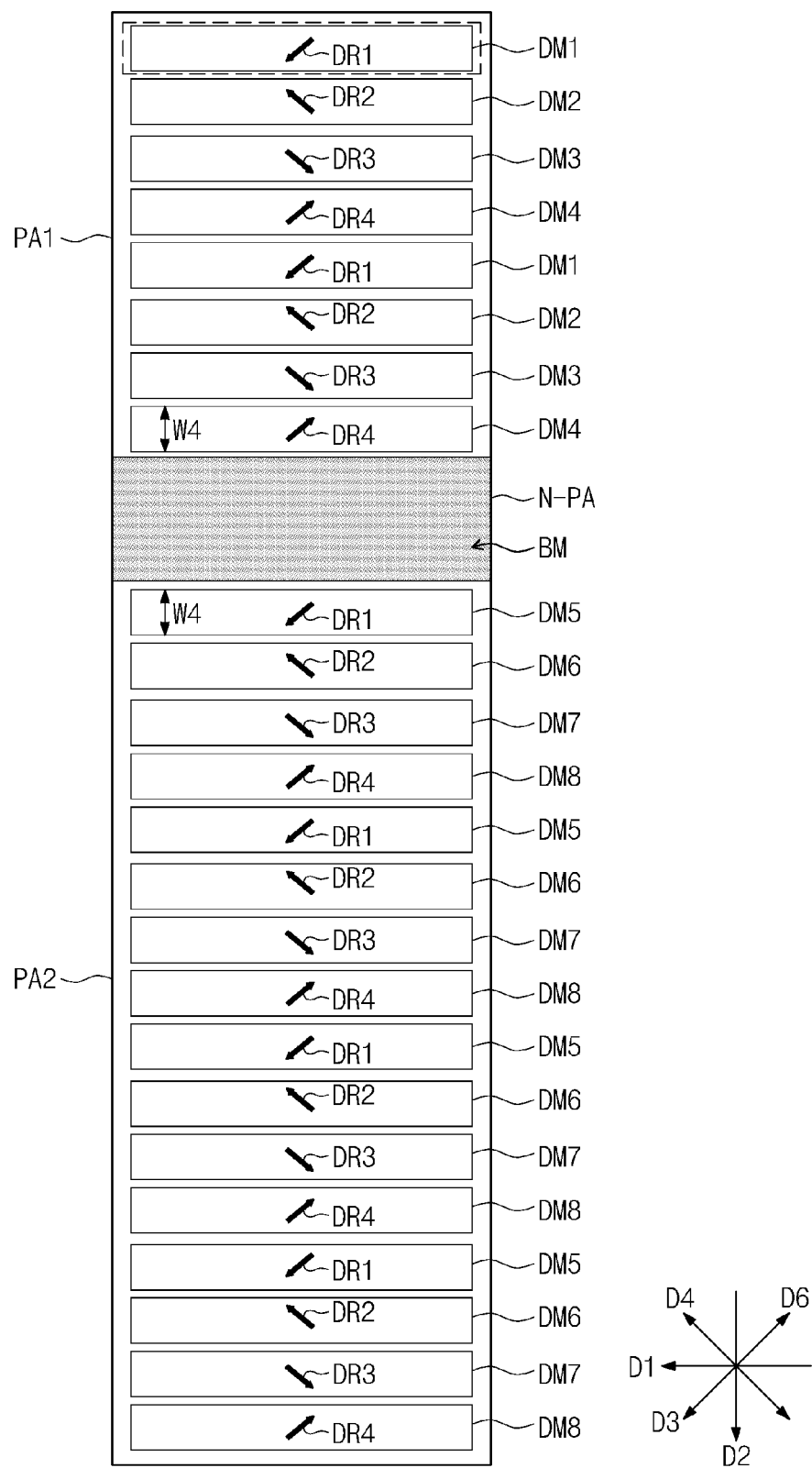
FIG. 9 is a view showing domains and liquid crystal alignment directions defined in a pixel area shown in FIG. 8.

FIG. 8 is a plan view showing a pixel of a curved display device according to another exemplary embodiment of the invention and FIG. 9 is a view showing domains and liquid crystal alignment directions defined in a pixel area shown in FIG. 8. In FIGS. 8 and 9, the same reference numerals denote the same elements in FIGS. 2 to 5, and thus detailed descriptions of the same elements will be omitted.

Referring to FIGS. 8 and 9, the curved display device includes a pixel electrode PE' disposed in the pixel area PA, and the pixel electrode PE' includes a first sub-pixel electrode PE1' disposed in the first sub-pixel area PA1 and a second sub-pixel electrode PE2' disposed in the second sub-pixel area PA2.

In the exemplary embodiment shown in FIGS. 2 to 5, the first to fourth unit domains DM1 to DM4 are defined in the first sub-pixel area PA1 (refer to FIG. 2) and the fifth to eighth unit domains DM5 to DM8 are defined in the second sub-pixel area PA2 (refer to FIG. 2). In this case, the number of each of the first to fourth unit domains DM1 to DM4 is one and the number of each of the fifth to eighth unit domains DM5 to DM8 is two. On the contrary, in the exemplary embodiment shown in FIGS. 8 and 9, the number of each of the first to fourth unit domains DM1 to DM4 defined in the first sub-pixel area PA1 is two and the number of the fifth to eighth unit domains DM5 to DM8 defined in the second sub-pixel area PA2 is four.

Accordingly, when the sizes of the first and second sub-pixel areas PA1 and PA2 shown in FIG. 2 are substantially the same as the sizes of the first and second sub-pixel areas PA1 and PA2 shown in FIG. 8, respectively, the number of the unit domains included in each of the first domain and the second domain shown in FIG. 8 is greater than that of the unit domains included in each of the first domain DMN1 (refer to FIG. 5) and the second domain DMN2 (refer to FIG. 5) shown in FIG. 2. As a result, a fourth width W4 in the second direction D2 of each of the first to fourth unit domains DM1 to DM4 is smaller than the first width W1 (refer to FIG. 5) or the second width W2 (refer to FIG. 5).

According to another exemplary embodiment, the number of each of the first to fourth unit domains DM1 to DM4 may be "n" (n is a natural number equal to or greater than 3) and the number of each of the fifth to eighth unit domains DM5 to DM8 may be "m" (m is a natural number equal to or greater than 5).

As shown in FIGS. 6 and 7, the pixel areas PA each in which the first to eighth domains DM1 to DM8 are defined are arranged in the display area DA (refer to FIGS. 6 and 7) in a matrix form. In this case, although the difference in brightness between the line domain groups occurs in accordance with the viewing angle of the user, the first effect described with reference to FIG. 6 may be generated since the two line domain groups having the relatively low brightness are not disposed adjacent to each other.

In addition, the unit domains defined in the first and second pixel areas PA1 and PA2 have the same width in the second direction D2. Therefore, the second effect described with reference to FIG. 6 may be generated since the line domain groups have the same width.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A curved display device comprising:
    a display substrate curved in a first direction and including a plurality of pixel areas, and each of the plurality of pixel areas comprising a first sub-pixel area and a second sub-pixel area;
    an opposite substrate facing the display substrate, the opposite substrate coupled to the display substrate and curved in the first direction together with the display substrate; and
    a liquid crystal layer interposed between the display substrate and the opposite substrate,
    wherein
    a plurality of first domains defined in the first sub-pixel area are sequentially arranged along a second direction crossing the first direction, wherein liquid crystal alignment directions in a plan view in which liquid crystal layer are aligned in one of the first domains are different from another one of the first domains adjacent to the one of the first domains,
a plurality of second domains defined in the second sub-pixel area are sequentially arranged along the second direction, wherein liquid crystal alignment directions in a plan view in which liquid crystal layer are aligned in one of the second domains are different from another one of the second domains adjacent to the one of the second domains, and
a width in the second direction of each of the first domains is equal to a width in the second direction of each of the second domains, and
wherein the first sub-pixel area and the second sub-pixel area defined in the each of the plurality of the pixel areas are sequentially arranged along the second direction, and a size of the first sub-pixel area is different from a size of the second sub-pixel area.

2. The curved display device of claim 1, wherein the display substrate further comprises a display area in which an image is displayed, and the display area has a curved shape curved in the first direction.

3. The curved display device of claim 2, wherein the first direction is substantially perpendicular to the second direction, a short side of the pixel area is parallel to the first direction, and a long side of the pixel area is parallel to the second direction.

4. The curved display device of claim 1, wherein the display substrate further comprises a pixel electrode disposed in each of the plurality of pixel areas, the opposite substrate comprises a common electrode which generates an electric field in cooperation with the pixel electrode, and the pixel electrode comprises:
a first sub-pixel electrode disposed in the first sub-pixel area; and
a second sub-pixel electrode disposed in the second sub-pixel area.

5. The curved display device of claim 4, wherein the display substrate further comprises:
a first data line electrically connected to the first sub-pixel electrode to which a first data signal is applied; and
a second data line electrically connected to the second sub-pixel electrode to which a second data signal different from the first data signal is applied.

6. The curved display device of claim 4, wherein
the first domains comprise a first unit domain, a second unit domain, a third unit domain, and a fourth unit domain, and liquid crystal alignment directions in which liquid crystal molecules of the liquid crystal layer are aligned in response to the electric field in the first to fourth unit domains are different from each other when viewed in a plan view, and
the second domains comprise a fifth unit domain, a sixth unit domain, a seventh unit domain, and an eighth unit domain, and liquid crystal alignment directions in which liquid crystal molecules of the liquid crystal layer are aligned in response to the electric field in the fifth to eighth unit domains are different from each other when viewed in the plan view.

7. The curved display device of claim 6, wherein a number of each of the first to fourth domains in the first domains is "n" (n is a natural number) and a number of each of the fifth to eighth domains in the second domains is "m" (m is a natural number).

8. The curved display device of claim 7, wherein
the first sub-pixel area has a size smaller than a size of the second sub-pixel area, and
the number of each of the first to fourth unit domains is smaller than the number of each of the fifth to eighth unit domains.

9. The curved display device of claim 7, wherein
the first sub-pixel electrode comprises:
first branch portions disposed in each of the n first unit domains and extending in a direction inclined with respect to the first and second directions when viewed in the plan view;
second branch portions disposed in each of the n second unit domains and extending in a direction inclined with respect to the first and second directions when viewed in the plan view;
third branch portions disposed in each of the n third unit domains and extending in a direction inclined with respect to the first and second directions when viewed in the plan view; and
fourth branch portions disposed in each of the n fourth unit domains and extending in a direction inclined with respect to the first and second directions when viewed in the plan view, and
the second sub-pixel electrode comprises:
fifth branch portions disposed in each of the m fifth unit domains and extending in a direction inclined with respect to the first and second directions when viewed in the plan view;
sixth branch portions disposed in each of the m sixth unit domains and extending in a direction inclined with respect to the first and second directions when viewed in the plan view;
seventh branch portions disposed in each of the m seventh unit domains and extending in a direction inclined with respect to the first and second directions when viewed in the plan view; and
eighth branch portions disposed in each of the m eighth unit domains and extending in a direction inclined with respect to the first and second directions when viewed in the plan view.

10. A curved display device comprising:
a display substrate curved in a first direction and comprising a plurality of pixel areas;
a pixel electrode disposed in each of the plurality of pixel areas, each of the plurality of pixel areas including a first sub-pixel area and a second sub-pixel area;
an opposite substrate facing the display substrate and including a common electrode that generates an electric field in cooperation with the pixel electrode, the opposite substrate coupled to the display substrate and curved in the first direction together with the display substrate; and
a liquid crystal layer interposed between the display substrate and the opposite substrate,
wherein
a plurality of first domains defined in the first sub-pixel area are sequentially arranged along a second direction crossing the first direction, wherein liquid crystal alignment directions in a plan view in which liquid crystal layer are aligned in one of the first domains are different from another one of the first domains adjacent to the one of the first domains,
a plurality of second domains defined in the second sub-pixel area are sequentially arranged along the second direction, wherein liquid crystal alignment directions in a plan view in which liquid crystal layer are aligned in one of the second domains are different from another one of the second domains adjacent to the one of the second domains, wherein the first sub-pixel area and the second sub-pixel area defined in the each of the plurality of the pixel areas are sequentially arranged along the second direction, and a size of the first sub-pixel area is different from a size of the second sub-pixel area, and directions, in which liquid crystal molecules of the liquid crystal layer are aligned in response to the electric field, are the same in at least two domains among the first domains and are the same in at least two domains among the second domains.

11. The curved display device of claim 10, wherein the display substrate further comprises a display area in which an image is displayed, and the display area has a curved shape curved in the first direction.

12. The curved display device of claim 11, wherein the first direction is substantially perpendicular to the second direction, a short side of the pixel area is parallel to the first direction, and a long side of the pixel area is parallel to the second direction.

13. The curved display device of claim 10, wherein
the first domains comprise a first unit domain, a second unit domain, a third unit domain, and a fourth unit domain, liquid crystal alignment directions in which the liquid crystal molecules of the liquid crystal layer are aligned in response to the electric field in the first to fourth unit domains are different from each other, and a number of each of the first to fourth domains in the first domains is "n" (n is a natural number), and
the second domains comprise a fifth unit domain, a sixth unit domain, a seventh unit domain, and an eighth unit domain, liquid crystal alignment directions in which liquid crystal molecules of the liquid crystal layer are aligned in response to the electric field in the fifth to eighth unit domains are different from each other, and a number of each of the fifth to eighth domains in the second domains is "m" (m is a natural number).

14. The curved display device of claim 13, wherein
the first to fourth unit domains are sequentially and n times repeatedly arranged in the first sub-pixel area, and
the fifth to eighth unit domains are sequentially and m times repeatedly arranged in the second sub-pixel area.

15. The curved display device of claim 13, wherein
widths in the second direction of the first to fourth unit domains, respectively, are the same, and
widths in the second direction of the fifth to eighth unit domains, respectively, are the same.

16. The curved display device of claim 13, wherein a first width in the second direction of each of the first to fourth unit domains is equal to a second width in the second direction of each of the fifth to eighth unit domains.

17. The curved display device of claim 16, wherein the first sub-pixel area has a size smaller than a size of the second sub-pixel area, and the number of each of the first to fourth unit domains is smaller than the number of each of the fifth to eighth unit domains.

18. The curved display device of claim 13, wherein
the pixel electrode comprises:
a first sub-pixel electrode disposed in the first sub-pixel area;
a second sub-pixel electrode disposed in the second sub-pixel area;
further comprising:
a first data line electrically connected to the first sub-pixel electrode to which a first data signal is applied; and
a second data line electrically connected to the second sub-pixel electrode to which a second data signal different from the first data signal is applied.

19. The curved display device of claim 18, wherein
the first sub-pixel electrode comprises:
first branch portions disposed in each of the n first unit domains and extending in a direction inclined with respect to the first and second directions when viewed in a plan view;
second branch portions disposed in each of the n second unit domains and extending in a direction inclined with respect to the first and second directions when viewed in the plan view;
third branch portions disposed in each of the n third unit domains and extending in a direction inclined with respect to the first and second directions when viewed in the plan view; and
fourth branch portions disposed in each of the n fourth unit domains and extending in a direction inclined with respect to the first and second directions when viewed in the plan view, and
the second sub-pixel electrode comprises:
fifth branch portions disposed in each of the m fifth unit domains and extending in a direction inclined with respect to the first and second directions when viewed in the plan view;
sixth branch portions disposed in each of the m sixth unit domains and extending in a direction inclined with respect to the first and second directions when viewed in the plan view;
seventh branch portions disposed in each of the m seventh unit domains and extending in a direction inclined with respect to the first and second directions when viewed in the plan view; and
eighth branch portions disposed in each of the m eighth unit domains and extending in a direction inclined with respect to the first and second directions when viewed in the plan view.

* * * * *